US008290644B2

(12) United States Patent
Bouquet

(10) Patent No.: US 8,290,644 B2
(45) Date of Patent: Oct. 16, 2012

(54) METHOD FOR AIRCRAFT LANDING ASSISTANCE USING GPS AND MLS IN CASE OF CALCULATED AXIAL APPROACH

(75) Inventor: Ludovic Bouquet, Paris (FR)

(73) Assignee: Thales, Neuilly sur Seine (FR)

( * ) Notice: Subject to any disclaimer, the term of this patent is extended or adjusted under 35 U.S.C. 154(b) by 282 days.

(21) Appl. No.: 12/809,636

(22) PCT Filed: Dec. 19, 2008

(86) PCT No.: PCT/EP2008/068084
§ 371 (c)(1),
(2), (4) Date: Aug. 2, 2010

(87) PCT Pub. No.: WO2009/083507
PCT Pub. Date: Jul. 9, 2009

(65) Prior Publication Data
US 2010/0286852 A1    Nov. 11, 2010

(30) Foreign Application Priority Data

Dec. 21, 2007  (FR) ..................... 07 09035

(51) Int. Cl.
*G06F 19/00*      (2006.01)
*G06G 7/70*       (2006.01)
(52) U.S. Cl. .................. 701/17; 701/3; 701/16; 701/18; 701/468; 701/508; 342/35; 342/63; 342/118; 342/140; 342/357.21; 342/357.29; 342/357.53; 73/178 T; 340/947; 340/952; 340/981; 340/982
(58) Field of Classification Search .................. 701/3, 4, 701/14, 16, 17, 18, 104, 120, 121, 408, 412, 701/468, 470, 505, 508, 520; 342/33, 34, 342/35, 63, 118, 125, 140, 146, 357.2, 357.21, 357.23, 357.28, 357.29, 357.36, 357.4, 357.49, 357.53, 357.68, 357.69, 357.71, 357.59; 340/947, 948, 951, 967, 970, 971, 972, 973, 340/974, 977, 979, 981, 982; 73/178 R, 178 H, 73/178 T; 343/705
See application file for complete search history.

(56) References Cited

U.S. PATENT DOCUMENTS 4,454,510 A  *  6/1984  Crow .............................. 342/32
(Continued)

FOREIGN PATENT DOCUMENTS
EP    0793116       9/1997
(Continued)

OTHER PUBLICATIONS

F.D. Powell "A Rotated-Coordinate Gaussian Position Reconstruction Algorithm for the Microwave Landing System," Journal of the Institute of Navigation USA, vol. 37, No. 3, Feb. 1990, pp. 273-283.

(Continued)

*Primary Examiner* — Hussein Elchanti
*Assistant Examiner* — Rami Khatib
(74) *Attorney, Agent, or Firm* — Baker & Hostetler LLP

(57) ABSTRACT

In a method for aiding aircraft landing using a GPS and an MLS within the context of a computed axial approach, the method uses coordinates of an azimuth antenna and/or of an elevation antenna as a reference point for the computation of a position of the aircraft in a reference frame centered on the landing runway. This position of the aircraft is thereafter used to determine an angle of azimuth between a longitudinal axis of the landing runway and the aircraft.

6 Claims, 4 Drawing Sheets

U.S. PATENT DOCUMENTS

| | | | | |
|---|---|---|---|---|
| 5,825,021 A | * | 10/1998 | Uemura | 250/222.1 |
| 6,239,745 B1 | * | 5/2001 | Stratton | 342/410 |
| 7,286,077 B2 | * | 10/2007 | Falcati et al. | 342/33 |
| 2005/0237235 A1 | | 10/2005 | Falcati et al. | |

FOREIGN PATENT DOCUMENTS

| | | |
|---|---|---|
| EP | 1589351 | 10/2005 |
| JP | 2287900 | 11/1990 |

OTHER PUBLICATIONS

J. W. Hall, et al., "Examination of RTCA/DO-198 Position Reconstruction Algorithms for Area Navigation with the Microwave Landing System," Defense Technical Information Center OAI-PMH Repository, ESD-TR-90-308, AD-A224 804, Jun. 1990, pp. 1-47.

D. Van Willigen, et al. "Air traffic systems," Radio Navigation, ET4-022, XP-002490240, Sep. 26, 2006, pp. 51-64.

* cited by examiner

METHOD FOR AIRCRAFT LANDING ASSISTANCE USING GPS AND MLS IN CASE OF CALCULATED AXIAL APPROACH

CROSS-REFERENCE TO RELATED APPLICATIONS

This application is a National Stage of International patent application PCT/EP2008/068084, filed on Dec. 19, 2008, which claims priority to foreign French patent application No. FR 07 09035, filed on Dec. 21, 2007, the disclosures of which are incorporated by reference in their entirety.

FIELD OF THE INVENTION

The invention relates to a method for aiding aircraft approach and landing using a microwave landing system and a global positioning system. The invention relates more particularly to a method for aiding aircraft approach and landing using a microwave landing system within the context of a computed axial approach.

BACKGROUND OF THE INVENTION

The Microwave Landing System, MLS, is an instrument approach and landing aid system intended to provide an aircraft with its position in spherical coordinates in a reference frame tied to the landing runway, that is to say an angle of azimuth, an angle of elevation and a distance between the landing runway and the aircraft. The distance between the runway and the aircraft is provided by auxiliary equipment for measuring distance known by the acronym DME standing for the expression "Distance Measurement Equipment" and operating on a different frequency or by a global positioning system. The MLS has been developed to alleviate the drawbacks of the Instrument Landing System (ILS) and adopted by the International Civil Aviation Organization (ICAO) to succeed ILS. MLS makes it possible to perform curved and segmented approaches, category I, II and III landings and allows an increase in aircraft landing rates by virtue of a decrease in the spacing between aircraft.

MLS, as standardized by the ICAO, transmits signals for lateral guidance, that is to say an angle of azimuth, and for vertical guidance, that is to say an angle of elevation, by using a time-referenced scanning beam technique and a time division multiplexed signal. The use of a time division multiplexed signal allows the transmission of the lateral and vertical guidance signals on the same radiofrequency channel without creating interference between the lateral guidance signals and the vertical guidance signals. The guidance signals are emitted on a frequency of around 5 GigaHertz (GHz) by an azimuth station and an elevation station. The azimuth station is placed at the end of the runway while the elevation station is situated on the side of the runway, about 300 meters (m) from the start-of-runway threshold. Each station transmits a narrow scanning beam sweeping the space of coverage to and from in outward and return fashion at constant angular speed following the relevant angular coordinate. An antenna and a receiver on board the aircraft receive the scanning beam a first time during the outward sweep and a second time during the return sweep. It is thus possible to determine the angle of azimuth and the angle of elevation through the following linear relation:

$$\theta = (T - T_0) \cdot \frac{v}{2} \quad (1)$$

where $\theta$ is the angle of azimuth or the angle of elevation,

T a time interval between the reception of the outward and return passes of the scanning beam, $T_0$ the value of the time interval T for a zero angle $\theta$ and v the angular sweep rate.

$T_0$ and v are constants defined by the international standards on MLS.

The microwave landing system with computed axial approach, called MLS-cc, the acronym standing for the expression "Microwave Landing System—Computed Centerline", is an MLS in which the azimuth station is not placed at the runway extremity but is offset to one side of the landing runway. The displacement of the azimuth station can notably be used in two typical cases. In the first case, the azimuth station is situated in proximity to the elevation station for the sake of simplicity of deployment of the MLS. This configuration is encountered mainly in the case of tactical equipment deployed on makeshift and unprepared strips. In the second case, the MLS-cc is used for the approach on a secondary runway not equipped with an MLS but situated in the zone of coverage of the runway equipped with the MLS. In both cases, on account of the offset of the azimuth station, the aircraft's receiver measures an angle, called the real azimuth angle, which does not correspond to the angle of azimuth in the conventional sense of the term, called the virtual azimuth angle. It is therefore necessary to compute the virtual azimuth angle so as to be able to provide the pilot with an item of information which is recentered with respect to the runway axis. To evaluate it, it is necessary to compute the position of the aircraft in a Cartesian reference frame centered on a ground reference point, called the ground point. This ground point is for example one of the two stations or the point of intersection between the runway axis and a straight line perpendicular to the runway axis and passing through the elevation station. This intersection point is called the MLS datum point.

The computation of the position of the aircraft is carried out through a system of 3 equations with 3 unknowns, parametrized by the real azimuth angle, the angle of elevation and a distance between the aircraft and the ground point. These equations being non-linear, iterative algorithms are used to solve the system. Conventionally, the iterative algorithms are of the Gauss-Seidel or Newton-Raphson type. By using a satellite positioning system, it is possible to use the MLS datum point as ground point for the determination of the distance to the aircraft. However, there are risks related to the behaviors of the iterative algorithms in this situation, as set out in the standard DO-226.

With the aim of optimizing the speed of convergence to the position of the aircraft and the precision of this position, two iterative algorithms can be used in succession, the first to converge quickly around the position of the aircraft, the second to obtain better precision of this position. However, such a combination of algorithms presents the drawback of complicating the determination of the position of the aircraft, making it difficult to set up the iterative algorithms and to validate them. Moreover, these algorithms are slow to execute, expensive in terms of computational load and behaviorally risky, in particular on account of the risks of multiple solutions, divergence and stationarity. Finally, these algorithms degrade the computational precision through their iterative nature, in particular the propagation of errors.

The iterative algorithms are executed by the aircraft's receiver, for example a multimode receiver (MMR). The MMR comprises a radiofrequency chain, a digital signal processor (DSP), a global positioning system (GPS) receiver, and a microprocessor. The radiofrequency chain receives signals originating from various systems, in particular the guidance signals originating from the azimuth station and from the elevation station. The processor processes the signals originating from the radiofrequency chain so as to extract the angles of azimuth and of elevation but also auxiliary words contained in the guidance signals. The GPS receiver can be internal or external. It transmits the airplane's positions. The microprocessor fulfills several functions, including computation of the distance between the MLS datum point and the aircraft, computation of the position of the aircraft on the basis of the iterative algorithms, computation of deviations between the position of the airplane and an optimal descent axis, management of the equipment and communication interfacing with a link of an airplane bus, for example an ARINC bus, the abbreviation for the "Aeronautical Radio Incorporated" series of standards. The microprocessor comprises a device for managing the algorithms making it possible to detect and process the divergence, non-convergence or false convergence of an algorithm, to manage the initialization, sequencing and combining of the algorithms.

SUMMARY OF THE INVENTION

An aim of the invention is notably to alleviate all or some of the aforementioned drawbacks. For this purpose, the subject of the invention is a method for aiding aircraft approach and landing using a global navigation satellite system and an MLS system within the context of a computed axial approach, the MLS system comprising a landing runway, an elevation station and an azimuth station, the landing runway defining a right-handed Cartesian reference frame ($R_c$) comprising as axes a longitudinal axis of the landing runway, called the first axis (x), a transverse axis of the landing runway passing through the elevation station, called the second axis (y) and an axis perpendicular to the first and second axes, called the third axis (z), a point of intersection between the first axis (x) and the second axis (y) defining the center of the reference frame ($R_c$), called the runway point, the elevation station comprising an elevation antenna and the azimuth station comprising an azimuth antenna, each antenna comprising a phase center, the phase centers of the elevation antenna and azimuth antenna being situated in a plane parallel to a plane (x, y) at a distance dz from the runway point along the third axis (z), characterized in that it comprises the following steps:

creating a reference point with the same coordinates as those of the phase center of the azimuth antenna and/or of the elevation antenna, determining a distance ρ between the reference point and the aircraft by the global navigation satellite system, determining an angle of azimuth ($\theta_R$) between a straight line passing through the phase center of the azimuth antenna and the aircraft and a plane parallel to a plane (x,z) passing through the phase center of the azimuth antenna, determining an angle of elevation ($\phi$) between a straight line passing through the phase center of the azimuth antenna and the aircraft and the plane parallel to the plane (x,y) passing through the phase centers of the elevation antenna and azimuth antenna, determining, on the basis of the distance ρ between the reference point and the aircraft, of the angle of azimuth and of the angle of elevation, the position of the aircraft with respect to the reference point.

The invention has notably the advantage that it makes it possible to reduce the complexity of the computation of the position of the aircraft, the computation no longer using an algorithm of the Gauss-Seidel or Newton-Raphson type but an algorithm for simply searching for the roots of a second-degree polynomial, such as described in the DO-198 standard. Consequently, the algorithm is less complex to certify and the problems related to the use of iterative algorithms are eliminated. In particular, the problems of divergence and stationarity, error propagation and multiple solutions are eliminated. Furthermore, the algorithm is less expensive in terms of computational load.

BRIEF DESCRIPTION OF THE DRAWINGS

The invention will be better understood and other advantages will become apparent on reading the detailed description of modes of realization given by way of example, which description is offered in relation to appended drawings which represent.

DETAILED DESCRIPTION

Figure 1:
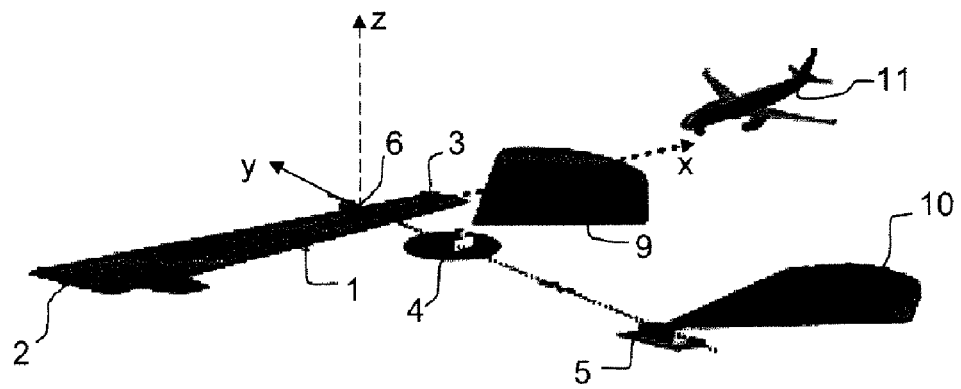
FIG. 1, an exemplary MLS configuration with computed axial approach.

FIG. 1 presents an exemplary MLS configuration within the context of a computed axial approach. The MLS comprises a landing runway 1 with runway axis x oriented from an end-of-runway threshold 2 toward the start-of-runway threshold 3, an elevation station 4 and an azimuth station 5. The landing runway defines a right-handed Cartesian reference frame $R_c$ with axes the longitudinal runway axis, called the first axis x, a transverse axis of the landing runway 1 passing through the elevation station 4, called the second axis y and an axis perpendicular to the first and second axes, called the third axis z. The second axis y is oriented from the elevation station 4 toward the landing runway 1. A point of intersection between the first axis x and the second axis y defines the center of the reference frame $R_c$ and is called the MLS datum point 6. It generally corresponds to the point at which the wheels of the aircraft touch down on the landing runway 1. The elevation station 4 comprises an elevation antenna 7 and the azimuth station 5 comprises an azimuth antenna 8. Each antenna comprises a phase center on the basis of which the coordinates of the antenna can be determined. For the subsequent description, the position of each antenna will therefore be regarded as that of its phase center. The elevation antenna 7 and azimuth antenna 8 emit guidance signals based on scanning beams 9 and 10 for vertical and lateral guidance of an aircraft 11 during an approach and/or landing phase. The scanning beams 9 and 10 also allow the transmission of auxiliary words containing, for example, coordinates of the elevation antenna 7 and of the azimuth antenna 8.

Figure 2:
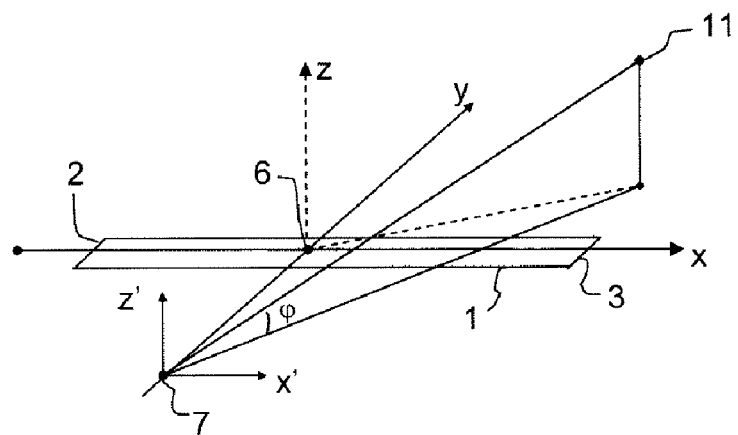
FIG. 2, an angle of elevation between an elevation antenna and an aircraft.

FIG. 2 represents an angle of elevation φ between the elevation antenna 7 and the aircraft 11. The angle of elevation φ is labeled in a Cartesian reference frame $R'_c$ centered on the elevation antenna 7 and with axes an axis x', the axis y and an axis z', the axes x' and z' being parallel respectively to the axes x and z. It is defined by the angle between the plane (x', y) and a straight line passing through the elevation antenna 7 and the aircraft 11.

Figure 3:
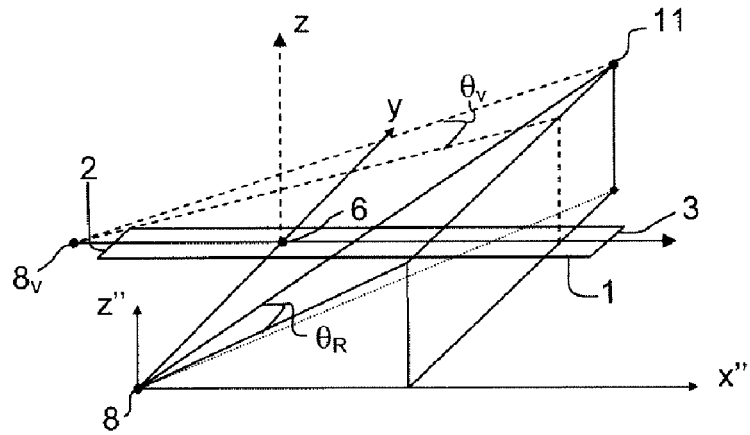
FIG. 3, angles of azimuth between, on the one hand, the azimuth antenna and the aircraft and, on the other hand, a landing runway axis and the aircraft.

FIG. 3 represents a real azimuth angle $θ_R$ and a virtual azimuth angle $θ_V$. The real azimuth angle $θ_R$ is labeled in a Cartesian reference frame $R''_c$ centered on the azimuth antenna 8 and with axes an axis x'', the axis y and an axis z'', the axes x'' and z'' being parallel respectively to the axes x and z. It is defined by the angle between the plane (x'', z'') and a straight line passing through the azimuth antenna 8 and the aircraft 11. The virtual azimuth angle $θ_V$ is labeled in the Cartesian reference frame $R_c$ and defined by the angle between the plane (x,z) and a straight line passing through the aircraft 11 and a virtual point 8v of the plane (x,z). This virtual point corresponds to an azimuth antenna within the context of an MLS system, usually situated on the first axis x a distance of 300 m after the end-of-runway threshold 2.

Figure 8:
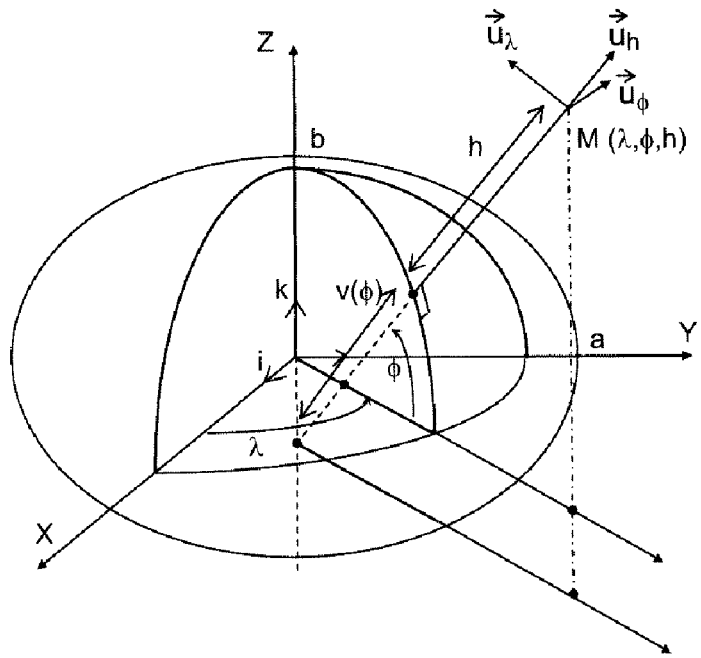
FIG. 8, a geographical reference frame and a geocartesian reference frame.

For the subsequent description, a geocartesian reference frame $R_{geocart}(O, X, Y, Z)$ and a geographical reference from $R_{geogra}(λ,φ,h)$ are considered in addition to the Cartesian reference frame $R_c$ centered on the MLS datum point 6, the Cartesian reference frame $R'_c$ centered on the elevation antenna 7 and the Cartesian reference frame $R''_c$ centered on the azimuth antenna 8, illustrated in FIG. 8. The geocartesian reference frame $R_{geocart}$ (O, X, Y, Z) is a reference frame in which the center O is close to the center of mass of the Earth, the axis OZ is close to the terrestrial rotation axis and the plane OXZ is close to the origin meridian plane. The geographical reference frame $R_{geogra}(λ,φ,h)$ is a reference frame in which the Earth is represented by an ellipsoid, each point M(λ,φ,h) being labeled with respect to this ellipsoid. λ denotes the longitude, i.e. the angle between the plane OXZ and the meridian plane containing the point concerned, φ denotes the latitude, i.e. the angle between the plane OXY and the normal to the ellipsoid passing through the point concerned and h denotes the ellipsoidal height. Each point M (λ,φ,h) defines a vector $\vec{u}_λ$ parallel to the plane P tangent to the ellipsoid passing through the orthogonal mapping of M (λ,φ,h) and oriented toward true North, a vector $\vec{u}_φ$ parallel to the plane P and oriented toward the East and a vector $\vec{u}_h$ orthogonal to the plane P. The ellipsoid representing the Earth is for example the ellipsoid WGS84 with semi-major axis a and semi-minor axis b. The eccentricity e and the major normal v(φ) of the ellipsoid are defined on the basis of the semi-major axis a and the semi-minor axis b through the relations:

$$e = \sqrt{\frac{a^2 - b^2}{a^2}}, \; v(φ) = \frac{a}{\sqrt{1 - e^2 * \sin^2(φ)}} \quad (2)$$

Figure 4:
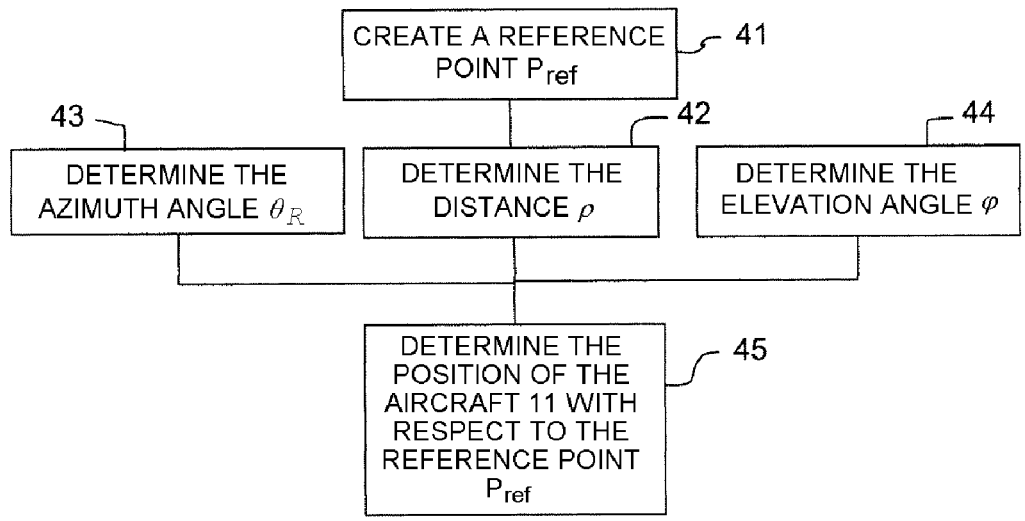
FIG. 4, an example of steps implemented by the method according to the invention.

FIG. 4 shows an example of steps implemented by the method according to the invention. For this method, the MLS configuration with computed axial approach described is considered with reference to FIG. 1 and in which the elevation antenna 7 and the azimuth antenna 8 are situated in one and the same horizontal plane parallel to the plane (x,y) and situated a distance dz above the latter. In a first step 41, a reference point Pref with the same coordinates as those of the azimuth antenna 8 or of the elevation antenna 7 is created. In a second step 42, a distance ρ between the reference point Pref and the aircraft 11 is determined by a global navigation satellite system. In a third step 43, the real azimuth angle $θ_R$ between the plane (x'',z'') and the straight line passing through the azimuth antenna 8 and the aircraft 11 is determined. In a fourth step 44, the angle of elevation φ between the plane (x',y) and the straight line passing through the elevation antenna 7 and the aircraft 11 is determined. In a fifth step 45, the position of the aircraft 11 is determined with respect to the reference point Pref on the basis of the distance ρ, of the real azimuth angle $θ_R$ and of the angle of elevation φ.

Such a method makes it possible to simplify the determination of the position of the aircraft 11 with respect to the reference point Pref. Indeed, the position of the aircraft 11 can be determined by way of a simplified algorithm. A simplified algorithm such as this is for example described in the DO-198 standard and set out partially as an annex. It is limited essentially to the determination of roots of a second-degree polynomial and consequently presents several advantages. A first advantage is the reduction in the complexity of the computation of the position of the aircraft 11. Consequently, the algorithm is less complex to certify, requires fewer computational resources than the state of the art algorithms and can be executed more quickly. A second advantage is the elimination of the iterative nature of the computation of the position of the aircraft 11. Consequently, the risks of multiple solutions, propagation of errors, divergence and stationarity are eliminated. On the basis of the position of the aircraft 11 with respect to the reference point Pref, the virtual azimuth angle $θ_V$ can be determined through the following relation:

$$θ_V = \arctan\left(\frac{-(y_M + y_{AZ})}{\sqrt{(x_M + D_{se})^2 + (z_M + z_{AZ})^2}}\right) \quad (3)$$

Where $(x_M, y_M, z_M)$ are the coordinates of the aircraft 11 in the reference frame $R_c$, $(x_{AZ}, y_{AZ}, z_{AZ})$ are the coordinates of the azimuth antenna 8 in the reference frame $R_c$, $D_{se}$ is the distance between the end-of-runway threshold 2 and the MLS datum point 6. The coordinates $y_{AZ}$ and $z_{AZ}$ can be determined on the basis of the auxiliary word A1 contained in the guidance signals. The distance $D_{se}$ can be determined by the auxiliary word A3.

Step 42 of determining the distance ρ between the reference point Pref and the aircraft 11 can be carried out according to at least two modes of realization.

Figure 5:
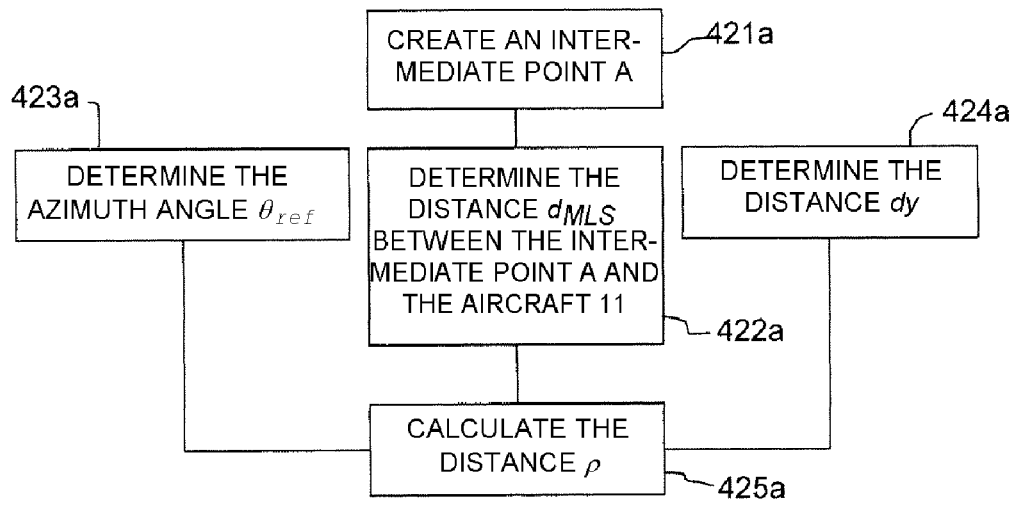
FIG. 5, an example of sub-steps for the determination of a distance between a reference point and the aircraft.
Figure 6:
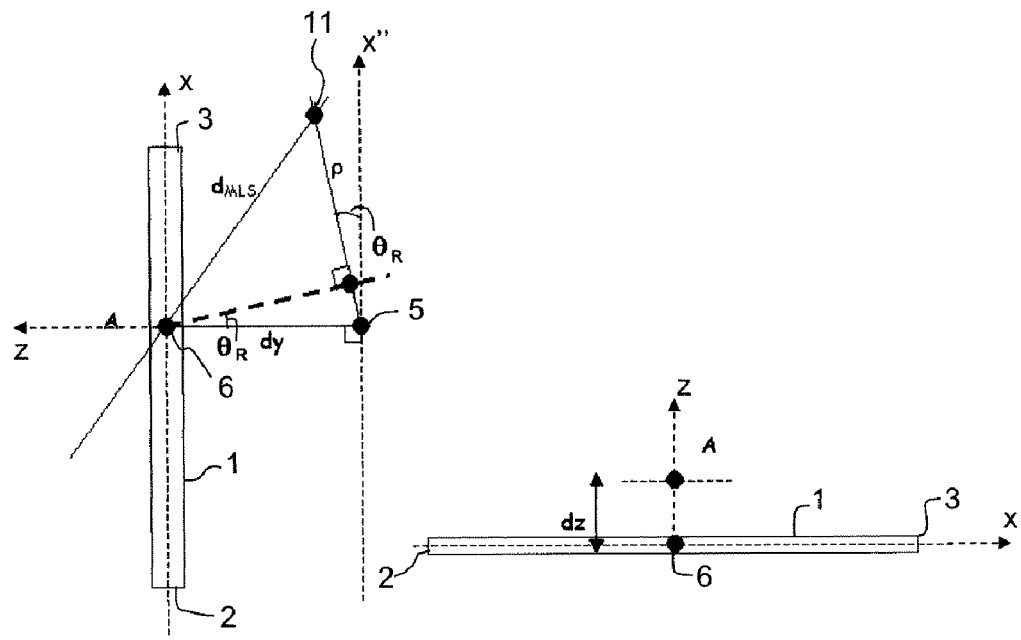
FIG. 6, an exemplary configuration of landing runway, reference point, azimuth station and aircraft for the determination of the distance between the reference point and the aircraft.
Figure 7:
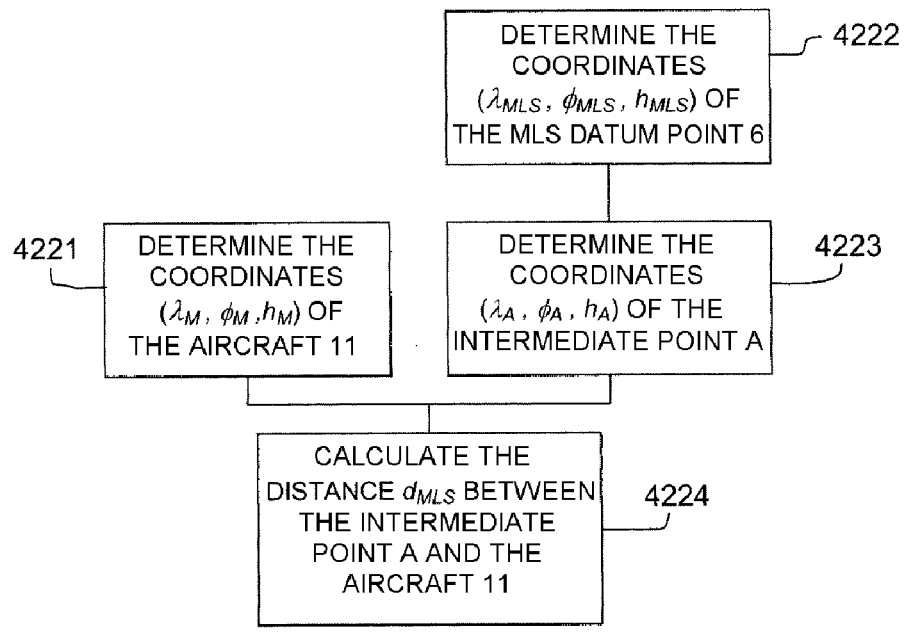
FIG. 7, an example of sub-steps for the determination of a distance between an intermediate point and the aircraft.

A first mode of realization is illustrated by FIGS. 5 and 6. In a first step 421a, an intermediate point A is created. The intermediate point A has, in the reference frame $R_c$, the same coordinates as the MLS datum point 6 along the first axis x and the second axis y and the same coordinate as the reference point Pref along the third axis z. The intermediate point A is therefore situated above the MLS datum point 6, the distance dz separating these two points. In a second step 422a, a distance $d_{MLS}$ between the intermediate point A and the aircraft 11 is determined. According to a particular mode of realization, the determination of the distance $d_{MLS}$ between the intermediate point A and the aircraft 11 comprises the following sub-steps, illustrated by FIG. 7. In a first step 4221, coordinates $(\lambda_M, \phi_M, h_M)$ of the aircraft 11 are determined, for example in the reference frame $R_{geogra}(\lambda,\phi,h)$. These coordinates $(\lambda_M, \phi_M, h_M)$ are determined by a global navigation satellite system, for example the GPS system, the aircraft 11 comprising a receiver processing the signals received from the satellites to determine its position. In a second step 4222, the coordinates $(\lambda_{MLS}, \phi_{MLS}, h_{MLS})$ of the MLS datum point 6 are determined, for example in the reference frame $R_{geogra}(\lambda,\phi,h)$. These coordinates $(\lambda_{MLS}, \phi_{MLS}, h_{MLS})$ can notably be determined on the basis of the signals emitted by the scanning beams 9 and 10. In particular, according to the standards defined by the ICAO, these coordinates are contained in the auxiliary words B40 and B41 of the signals. In a third step 4223, the coordinates $(\lambda_A, \phi_A, h_A)$ of the intermediate point A are determined on the basis of the coordinates $(\lambda_{MLS}, \phi_{MLS}, h_{MLS})$ of the MLS datum point 6 through the following relations:

$$\begin{vmatrix} \lambda_A = \lambda_{MLS} \\ \phi_A = \phi_{MLS} \\ h_a = h_{MLS} + dz \end{vmatrix} \quad (4)$$

In a fourth step 4224, the distance $d_{MLS}$ between the intermediate point A and the aircraft 11 is computed on the basis of the coordinates $(\lambda_M, \phi_M, h_M)$ of the aircraft 11 and of the coordinates $(\lambda_A, \phi_A, h_A)$ of the intermediate point A. In a particular mode of realization, the coordinates $(\lambda_M, \phi_M, h_M)$ and $(\lambda_A, \phi_A, h_A)$ are converted into coordinates $(X_M, Y_M, Z_M)$ and $(X_A, Y_A, Z_A)$ in the reference frame $R_{geocart}$ through the following formulae:

$$\begin{vmatrix} X_M = (v(\phi_M) + h_M)\cos\phi_M\cos\lambda_M \\ Y_M = (v(\phi_M) + h_M)\cos\phi_M\sin\lambda_M \\ Z_M = [(b^2/a^2)v(\phi_M) + h_M]\cdot\sin\phi_M = [(1-e^2)v(\phi_M) + h_M]\cdot\sin\phi_M \end{vmatrix} \quad (5)$$

The same formulae make it possible to determine the coordinates $(X_A, Y_A, Z_A)$ by replacing $\lambda_M, \phi_M$ and $h_M$ with $\lambda_A, \phi_A$ and $h_A$.

The distance $d_{MLS}$ can thereafter be computed through the following relation:

$$d_{MLS} = \sqrt{(X_M-X_A)^2+(Y_M-Y_A)^2+(Z_M-Z_A)^2} \quad (6)$$

Note that the determination of the coordinates of the aircraft 11, corresponding to step 4221, can also be performed after or during step 4222 and/or step 4223. In all cases, step 4224 of computing the distance $d_{MLS}$ must be accomplished as quickly as possible after step 4221 of determining the coordinates of the aircraft 11 so as to obtain a distance $d_{MLS}$ practically in real time. In a third step 423a, an angle of azimuth $\theta_{ref}$ between the aircraft 11 and a plane parallel to the plane (x,z) passing through the reference point $P_{ref}$ is determined. Advantageously, the reference point $P_{ref}$ has the same coordinates as those of the azimuth antenna 8. The angle of azimuth $\theta_{ref}$ can then be directly determined, this angle being equal to the real azimuth angle $\theta_R$. In a fourth step 424a, a distance dy between the MLS datum point 6 and the reference point $P_{ref}$ along the second axis y is determined. According to a particular mode of realization, the distance dy is determined on the basis of the auxiliary words transmitted to the aircraft 11 by the signals emitted by the elevation station 4 and azimuth station 5. In particular, the distance dy is contained in bits 21 to 30 of the auxiliary word A1. In a fifth step 425a, the distance $\rho$ is computed on the basis of the angle of azimuth $\theta_{ref}$ and of the distances $d_{MLS}$ and dy through the following relation:

$$\rho = \sqrt{d_{MLS}^2 - (dy,\cos\theta_{ref})^2} + dy, \sin\theta_{ref} \quad (7)$$

Note that the order of steps 422a, 423a and 424a is of no importance, it being possible for the operations related to these steps to be performed in a different order or simultaneously.

Figure 9:
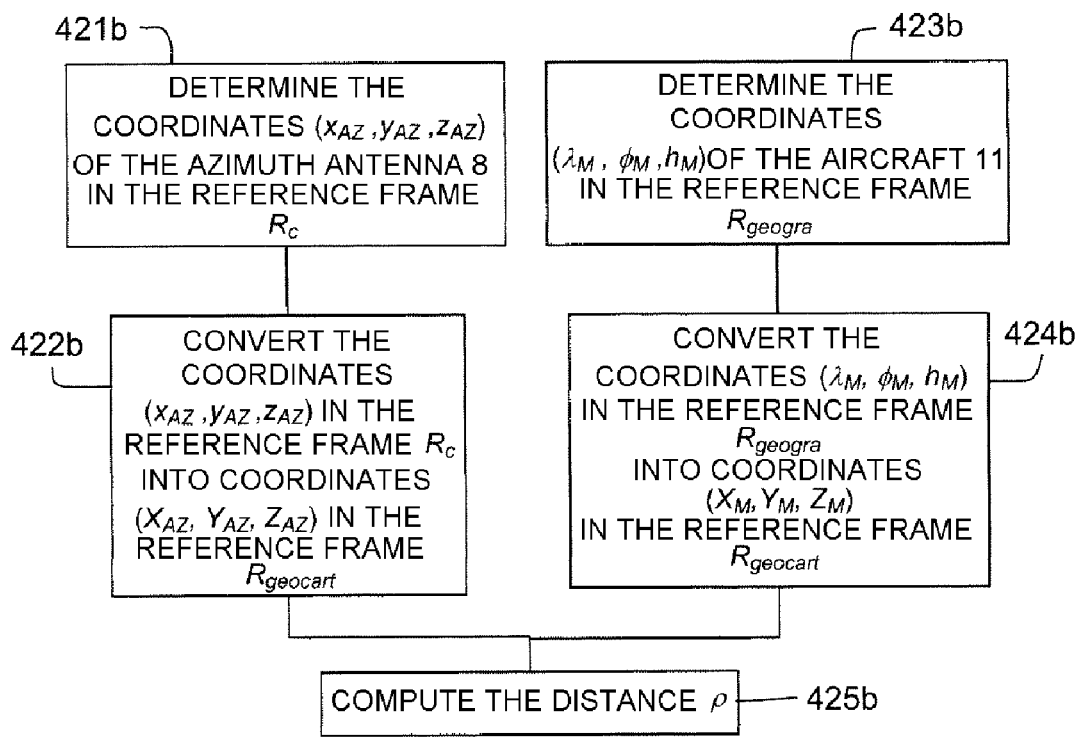
FIG. 9, another example of sub-steps for the determination of the distance between the reference point and the aircraft.

A second mode of realization is illustrated by FIGS. 8 and 9. In a first step 421b, the coordinates $(x_{AZ}, y_{AZ}, z_{AZ})$ of the azimuth antenna 8, labeled by the point $S_{AZ}$, are determined in the Cartesian reference frame $R_c$, for example by the auxiliary words transmitted to the aircraft 11 by the elevation station 4 and azimuth station 5. According to the standards established by the ICAO, the coordinate $x_{AZ}$ can be determined by the auxiliary word A1, in particular bits 31 to 43, the coordinate $y_{AZ}$ can be determined by bits 21 to 30 of the auxiliary word A1 and the coordinate $z_{AZ}$ can be determined by bits 57 to 63 of the auxiliary word A1. In a second step 422b, the coordinates $(x_{AZ}, y_{AZ}, Z_{AZ})$ in the reference frame $R_c$ are converted into coordinates $(X_{AZ}, Y_{AZ}, Z_{AZ})$ in the reference frame $R_{geocart}$. The conversion can notably be performed by decomposing the vector $\overrightarrow{OS_{AZ}}$ into a vector $\overrightarrow{OR}$ and a vector $\overrightarrow{RS_{AZ}}$ where the point R is the MLS datum point 6:

$$\overrightarrow{OS_{AZ}} = \overrightarrow{OR} + \overrightarrow{RS_{AZ}} \quad (8)$$

The coordinates of the point R in the reference frame $R_{geocart}$ are:

$$\overrightarrow{OR} = \begin{pmatrix} (v(\phi_R)+h) \\ 0 \\ 0 \end{pmatrix} \begin{pmatrix} \vec{u}_\lambda \\ \vec{u}_\phi \\ \vec{u}_h \end{pmatrix} = \begin{pmatrix} (v(\phi_R)+h)\cos\phi_R\cos\lambda_R \\ (v(\phi_R)+h)\cos\phi_R\sin\lambda_R \\ \left[\left(\frac{b^2}{a^2}\right)v(\phi_R)+h\right]\sin\phi_R \end{pmatrix} \begin{pmatrix} \vec{X} \\ \vec{Y} \\ \vec{Z} \end{pmatrix} \quad (9)$$

where the coordinates $(\lambda_R, \phi_R, h_R)$ can be obtained through auxiliary words B40 and B41 originating from the scanning beams 9 and 10. The vector $\overrightarrow{RS_{AZ}}$ can be determined in the reference frame $R_{geocart}$ through the relations:

$$\overrightarrow{RS_{AZ}} = \begin{pmatrix} x_{AZ} \\ y_{AZ} \\ z_{AZ} \end{pmatrix} \begin{pmatrix} \vec{x} \\ \vec{y} \\ \vec{z} \end{pmatrix} = \begin{pmatrix} x_{AZ} \\ y_{AZ} \\ z_{AZ} \end{pmatrix} \begin{pmatrix} \cos\psi & -\sin\psi & 0 \\ -\sin\psi & -\cos\psi & 0 \\ 0 & 0 & 1 \end{pmatrix} \begin{pmatrix} \vec{u}_\lambda \\ \vec{u}_\phi \\ \vec{u}_h \end{pmatrix} \quad (10)$$

Where the angle $\psi$ is the angle between the first axis x and true North, this angle possibly being obtained through the auxiliary word A1 or B41, And where the vectors $\vec{u}_\lambda$, $\vec{u}_{100}$ and $\vec{u}_h$ can be determined in the reference frame $R_{geocart}$ through the relations:

$$\vec{u}_\lambda = \begin{pmatrix} -\sin\phi_R\cos\lambda_R \\ -\sin\phi_R\sin\lambda_R \\ \cos\phi_R \end{pmatrix} \cdot \begin{pmatrix} \vec{X} \\ \vec{Y} \\ \vec{Z} \end{pmatrix} \quad (11)$$

$$\vec{u}_\phi = \begin{pmatrix} -\sin\lambda_R \\ \cos\lambda_R \\ 0 \end{pmatrix} \cdot \begin{pmatrix} \vec{X} \\ \vec{Y} \\ \vec{Z} \end{pmatrix}$$

$$\vec{u}_h = \begin{pmatrix} \cos\phi_R\cos\lambda_R \\ \cos\phi_R\sin\lambda_R \\ \sin\phi_R \end{pmatrix} \cdot \begin{pmatrix} \vec{X} \\ \vec{Y} \\ \vec{Z} \end{pmatrix}$$

In a third step 423b, the coordinates ($\lambda_M$, $\phi_M$, $h_M$) of the aircraft 11, labeled by the point M, are determined, for example in the reference frame $R_{geogra}(\lambda, \phi, h)$. These coordinates ($\lambda_M$, $\phi_M$, $h_M$) can notably be determined by a global navigation satellite system, for example the GPS, the aircraft 11 comprising a receiver processing the signals received from the satellites to determine its position. In a fourth step 424b, the coordinates ($\lambda_M$, $\phi_M$, $h_M$) in the reference frame $R_{geogra}$ ($\lambda$, $\phi$, h) are converted into coordinates ($X_M$, $Y_m$, $Z_M$) in the reference frame $R_{geocart}$. The coordinates of the aircraft 11 in the reference frame $R_{geocart}$ are:

$$\begin{vmatrix} X_M = (v(\phi_M) + h_M)\cos\phi_M\cos\lambda_M \\ Y_M = (v(\phi_M) + h_M)\cos\phi_M\sin\lambda_M \\ Z_M = [(b^2/a^2)v(\phi_M) + h_M]\cdot\sin\phi_M = [(1-e^2)v(\phi_M) + h_M]\cdot\sin\phi_M \end{vmatrix} \quad (12)$$

In a fifth step 425b, the distance $\rho$ is computed on the basis of the coordinates ($X_{AZ}$, $Y_{AZ}$, $Z_{AZ}$) and ($X_M$, $Y_M$, $Z_M$) through the following relation:

$$\rho = \sqrt{(X_M-X_{AZ})^2 + (Y_M-Y_{AZ})^2 + (Z_M-Z_{AZ})^2} \quad (13)$$

Note that steps 421b and 422b can be performed before, after or simultaneously with steps 423b and 424b. This second mode of realization exhibits the advantage of not using any measurement of azimuth angle for the computation of the distance $\rho$ between the reference point $P_{ref}$ and the aircraft 11. This results in greater precision in the computation of the distance $\rho$ and consequently in the computation of the position of the aircraft 11.

The method described above can notably be applied by an onboard device on an aircraft 11. This device is for example an onboard multimode receiver, commonly called a "multimode receiver" and abridged to "MMR". The function of an onboard multimode receiver is to precisely guide the aircraft 11 during a final approach and landing phase. It can notably indicate to a pilot of the aircraft 11 that he is deviating from the optimal descent trajectory. The MMR can normally operate in the ILS, VOR, MLS and differential GPS modes, "VOR" being the acronym of "Very high frequency Omnidirectional Range". In the ILS, VOR and MLS modes, the MMR receives a radiofrequency signal from an ILS antenna, from a VOR antenna or from the MLS antennas, as the case may be. The radiofrequency signal is decoded and the deviations of the aircraft 11 with respect to the optimal descent trajectory are computed and transmitted to a flight management system of the aircraft 11. According to the invention, the MMR is used in MLS mode. The MMR comprises means for acquiring radiofrequency signals receiving the guidance signals of the scanning beams 9 and 10, means for processing the radiofrequency signals and means for determining the position of the aircraft 11 with respect to the reference point Pref according to the method described above. The MMR can also comprise a global navigation satellite system receiver, for example a GPS receiver. According to another mode of realization, the GPS receiver can also be external to the MMR, an interface between the MMR and the GPS receiver being for example effected by means of a serial bus, for example an ARINC bus. In a particular mode of realization, the MMR comprises means for determining the virtual azimuth angle $\theta_v$ on the basis of the position of the aircraft 11. The ARINC bus can be used to exchange data between the MMR and a flight management system of the aircraft 11. In particular, the position of the aircraft 11, the virtual azimuth angle $\theta_v$, the elevation angle $\phi$ and/or the distance $\rho$ can be transmitted to an automatic pilot of the aircraft 11.

ANNEX

This annex presents the problem of computing the position of an aircraft and a simplified algorithm allowing this computation inspired by the DO-198 standard.

Presentation of the Problem and Geometric Formalization

The MLS-cc function is used for landings on runways equipped with MLS stations situated in non-optimal positions (offset of the azimuth station or azimuth station of another landing runway).

The knowledge of the angle of azimuth and of the angle of elevation obtained on the basis of the information transmitted by the MLS stations and also of the distance with respect to a ground point (use of a DME or of a GPS) makes it possible to compute the position of the aircraft, the position of the stations with respect to one another being known.

The following notation is defined in a right-handed Cartesian reference frame:

($x_M$, $y_M$, $z_M$): coordinates of the aircraft,
($x_{AZ}$, $y_{AZ}$, $z_{AZ}$): coordinates of the azimuth antenna,
($x_S$, $y_S$, $z_S$): coordinates of the elevation antenna,
($x_D$, $y_D$, $z_D$): coordinates of the DME or of the reference point $P_{ref}$,
$\rho$: distance between the aircraft and the DME or the reference point,
$\theta$: azimuth angle, in radians,
$\phi$: elevation angle, in radians.

The angle $\phi$ corresponds to the angle between the aircraft and the runway axis and not to the angle between the aircraft and the descent plane such as measured in MLS. A correction, consisting in adding the slope, is therefore necessary to obtain $\phi$ on the basis of the datum provided by the MLS.

It is possible to compute $\rho$, $\theta$ and $\phi$ on the basis of the following relations:

$$\rho = \sqrt{(x_M-x_D)^2 + (y-y_D)^2 + (z-z_D)^2} \quad (0.1)$$

$$\theta = \arctan\left[-\frac{y_M - y_{AZ}}{\sqrt{(x_M - x_{AZ})^2 + (z_M - z_{AZ})^2}}\right] \quad (0.2)$$

$$\phi = \arctan\left[\frac{z_M - z_S}{\sqrt{(x_M - x_S)^2 + (y_M - y_S)^2}}\right] \quad (0.3)$$

The above equations are equivalent to:

$$x_M = x_D + \sqrt{\rho^2 - (y_M-y_D)^2 - (z_M-z_D)^2} \text{ with } x_M > x_D$$

$$y_M = y_{AZ} - \tan\theta \sqrt{(x_M - x_{AZ})^2 + (z_M - z_{AZ})^2} \qquad (1.2)$$

$$z_M = z_S + \tan\phi \sqrt{(x_M - x_S)^2 + (y_M - y_S)^2} \qquad (1.3)$$

Solving the system of non-linear equations (1.1) to (1.3) is complex and requires the use of an iterative algorithm, for example defined in the DO-226 standard. However, in certain typical cases, the problem can be simplified. For this purpose, particular ground geometry characteristics are necessary. According to these characteristics, one of the two antennas of the MLS stations and the reference point are situated at the same place and the elevation and azimuth antennas are situated in one and the same horizontal plane.

Simplification of the Problem and Necessary Assumptions

The origin of the Cartesian reference frame is fixed at the point where the azimuth antenna is situated. We therefore have $(x_{AZ}, y_{AZ}, z_{AZ}) = (0, 0, 0)$ The distance between the aircraft and the azimuth station is determined, on the one hand, by the aircraft's coordinates $(x_M, y_M, z_M)$ obtained by a global navigation satellite system receiver on board the aircraft and, on the other hand, by the azimuth antenna's coordinates $(x_{AZ}, y_{AZ}, z_{AZ})$ transmitted by the elevation station or the azimuth station in the auxiliary words B40 and B41.

For the subsequent description, it will be considered that the azimuth antenna and the reference point are situated at the same place. Similar results would however be obtained by considering the elevation antenna and the reference point to be situated at the same place. We therefore have $(x_{AZ}, y_{AZ}, z_{AZ}) = (x_D, y_D, z_D)$. On the basis of equations (1.1) to (1.3) we can write:

$$x_M^2 = \rho^2 - y_M^2 - z_M^2 \qquad (2.1)$$

$$y_M = -\tan\theta \sqrt{x_M^2 + z_M^2} \qquad (2.2)$$

$$z_M = z_S + \tan\phi \sqrt{(x_M - x_S)^2 + (y_M - y_S)^2} \qquad (2.3)$$

Combining (2.1) and (2.2) gives:

$$y_M = \rho \sin\theta \qquad (2.4)$$

The coordinate $y_M$ of the aircraft is therefore easily computable on the basis of the knowledge of $\rho$ and $\theta$ alone.

Because the elevation and azimuth antennas are situated in the same horizontal plane, we have $z_S = 0$. Combining equations (2.1) and (2.3) gives:

$$x_M^2 - 2x_M x_S \sin^2\phi + \sin^2\phi(d^2 + y_M^2 - 2y_M y_S) - \rho^2 \cos^2\theta \cos^2\phi = 0 \qquad (2.5)$$

where d denotes the distance between the elevation antenna and the azimuth antenna, i.e.:

$$d = \sqrt{x_S^2 + y_S^2}$$

Finding the coordinate $x_M$ of the aircraft therefore reduces to solving a second-degree equation (2.5) where $a=1$, $b=2x_S \sin^2\phi$ and $c = \sin^2\phi(d^2 + y_M^2 - 2y_M y_S) - \rho^2 \cos^2\theta \cos^2\phi$.

The determinant is:

$$\Delta = 4x_S^2 \sin^4\phi - 4[\sin^2\phi(d^2 + y_M^2 - 2y_M y_S) - \rho^2 \cos^2\theta \cos^2\phi]$$

Solving this equation leads to multiple solutions since the solutions are of the form:

$$x_M = -x_S \sin^2\phi \pm \frac{\sqrt{\Delta}}{2} \qquad (2.6)$$

The first solution, $$x_M = -x_S \sin^2\phi - \frac{\sqrt{\Delta}}{2},$$

is always negative, the coordinate $x_S$ always being positive. This solution corresponds to a situation where the aircraft is situated behind the azimuth antenna, that is to say outside of the sector covered by the sweep of the elevation and azimuth stations. This solution is therefore not possible.

The second solution, $$x_M = -x_S \sin^2\phi + \frac{\sqrt{\Delta}}{2},$$

corresponds to a situation where the aircraft is situated in front of the azimuth antenna. This is the relevant solution in the case of an aircraft performing a computed axial approach.

The coordinate $z_M$ of the aircraft can then be determined through equation (2.1), i.e.:

$$z_M = \pm\sqrt{\rho^2 - y_M^2 - x_M^2}$$

The first solution, $z_M = -\sqrt{\rho^2 - y_M^2 - x_M^2}$, corresponds to a position of the aircraft below the azimuth antenna. This solution is therefore not possible.

The second solution, $z_M = +\sqrt{\rho^2 - y_M^2 - x_M^2}$, corresponds to a position of the aircraft above the azimuth antenna. This is the relevant solution.

It is therefore always possible to determine the position of the aircraft through the following relations:

$$\begin{vmatrix} x_M = -x_S \sin^2\phi + \frac{\sqrt{\Delta}}{2} \\ y_M = \rho\sin\theta \\ z_M = +\sqrt{\rho^2 - y_M^2 - x_M^2} \end{vmatrix}$$

The invention claimed is:

1. A method for aiding aircraft approach and landing using a global navigation satellite system and a microwave landing system MLS system within the context of a computed axial approach, the MLS system comprising a landing runway, an elevation station and an azimuth station, the landing runway defining a right-handed Cartesian reference frame comprising as axes a first longitudinal axis of the landing runway, a second transverse axis of the landing runway passing through the elevation station, and a third axis perpendicular to the first and second axes, a point of intersection between the first axis and the second axis defining a runway point corresponding to the center of the reference frame, the elevation station comprising an elevation antenna and the azimuth station comprising an azimuth antenna, each antenna comprising a phase center, the phase centers of the elevation antenna and azimuth antenna being situated in a plane parallel to a plane at a distance from the runway point along the third axis, the method comprising the following steps:

creating a reference point with the same coordinates as those of the phase center of at least one of the azimuth antenna and the elevation antenna;

determining a distance between the reference point and the aircraft by the global navigation satellite system;

determining an angle of azimuth between a straight line passing through the phase center of the azimuth antenna and the aircraft and a plane parallel to a plane passing through the phase center of the azimuth antenna;

determining an angle of elevation between a straight line passing through the phase center of the azimuth antenna and the aircraft and the plane parallel to the plane passing through the phase centers of the elevation antenna and azimuth antenna; and determining, on the basis of the distance between the reference point and the aircraft, of the angle of azimuth and of the angle of elevation, the position of the aircraft with respect to the reference point, wherein the determination of the distance between the reference point and the aircraft comprising the following steps:

creating, in the right-handed Cartesian reference frame, an intermediate point with the same coordinates as the coordinates of the runway point along the first axis and the second axis and with the same coordinate as the reference point along the third axis;

determining a distance between the intermediate point and the aircraft;

determining an angle of azimuth between the plane and a straight line passing through the reference point and the aircraft;

determining a distance between the runway point and the reference point along the second axis; and computing the distance between the reference point and the aircraft through the relation $\rho = \sqrt{d_{MLS}^2 - (dy.\cos\theta_{ref})^2} + dy.\sin\theta_{ref}$, where $\rho$ is the distance between the reference point and the aircraft, $d_{MLS}$ is the distance between the intermediate point and the aircraft, y is the second axis, dy is the distance between the runway point and the reference point along the second axis, and $\theta_{ref}$ is the angle of azimuth between the plane (x, z) and a straight line passing through the reference point and the aircraft.

2. The method of claim 1, wherein the determination of the distance between the intermediate point and the aircraft comprises the following steps:
   determining coordinates of the aircraft;
   determining coordinates of the runway point
   determining coordinates of the intermediate point on the basis of the coordinates of the runway point; and
   computing the distance between the intermediate point and the aircraft on the basis of the coordinates of the aircraft and those of the intermediate point.

3. The method of claim 2, wherein the coordinates of the runway point are determined on the basis of signals emitted by the elevation station or the azimuth station.

4. The method of claim 2, wherein the coordinates of the aircraft are determined by a global positioning system.

5. A multimode receiver able to equip an aircraft for aiding approach and landing with computed axial approach comprising:
   means for acquiring radiofrequency signals;
   means for processing the radiofrequency signals, and
   means for determining a position of an aircraft by the method of claim 1.

6. The multimode receiver of claim 5, further comprising a global navigation satellite system receiver.

* * * * *